Inventors:
Noble E. Hamilton
George J. Shinopulos

By: *Lowell H. McCarter* their attorney

Inventors:
Noble E. Hamilton
George J. Shinopulos

By: Lowell H. McCarter
their attorney

United States Patent Office 3,588,933
Patented June 29, 1971

3,588,933
**METHOD AND APPARATUS FOR SIMULTANE-
OUSLY UPSET FORMING BOTH ENDS OF A
DUCTILE MATERIAL ROD BLANK OR THE
LIKE**
George J. Shinopulos, 25 Eugene Road, Burlington, Mass.
01803, and Noble E. Hamilton, 35 Ledgewood Road,
Weston, Mass. 02193
Filed June 19, 1968, Ser. No. 738,219
Int. Cl. B21d *22/00;* B21k *1/44, 1/52;* B23g *9/00*
U.S. Cl. 10—12                                                7 Claims

ABSTRACT OF THE DISCLOSURE

Simultaneous upset forming both ends of a ductile rod or the like without the necessity of a clamping means for holding the rod securely is accomplished by the method and apparatus described.

FIELD OF INVENTION AND PRIOR ART

Figure 1:
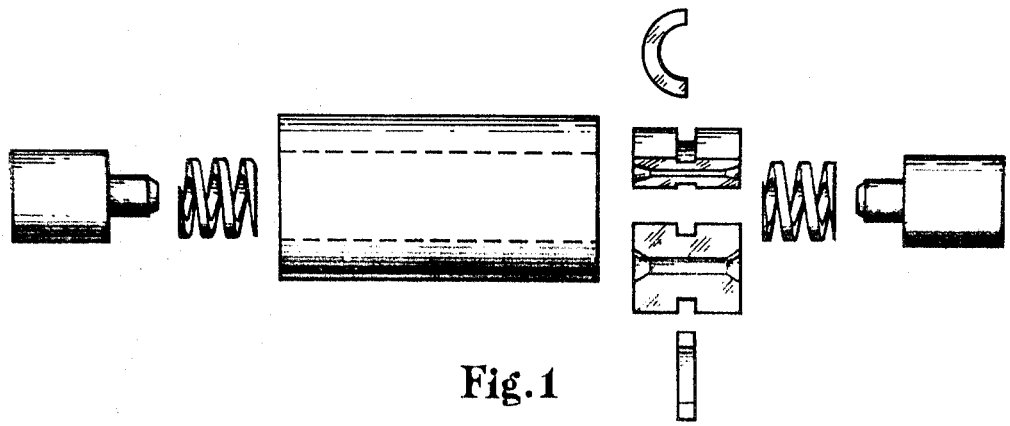

This invention relates generally to the metal deforming art and specifically to heading and upset forging operations.

In the prior art deforming methods it was necessary in heading operations to provide a complicated die design to obtain a good product having close tolerances. Auxiliary clamping, holding and positioning mechanisms were required where the heading operation was to be done on both ends of the rod blank or starting material. This generally resulted in the formed part being damaged or marred where the clamping mechanism was applied. Almost invariable severe cold working resulted in detrimental changes in the metal caused by the permanent strain introduced by the external cold work forces. Therefore the metal fabricator frequently had to resort to machining methods to produce an acceptable metal part. Machining methods require expensive labor and equipment and result in a high scrap loss.

OBJECTS AND SUMMARY OF INVENTION

It is therefore the principal object of this invention to provide a means and a method of simply and simultaneously deforming both ends of a rod blank.

Another object is to provide a means for self-positioning a blank of material in a die without auxiliary clamping or holding means. Still another object is to provide a means whereby the tool members advance at preselected rates toward both ends of the blank of material. Yet another object is to provide a means and method of upsetting the ends of a blank without severe clamping, marking or changing the physical structure of the central section of the blank. Still another object is to provide apparatus and method of producing a high quality tensile specimen from a minimum amount of material at a significant economization of labor costs.

In summary the novel method comprises simultaneously upsetting both ends of a rod blank having been previously reduced to size as by swaging and cut to length. It consists of placing a blank of material to be formed in a preformed open ended die held in a retaining means, said die having a central cavity loosely fitting the blank and end cavities shaped to form the desired upset section, advancing plungers toward both ends of the die whereby the blank is positioned in the open ended die, continuing to advance the plungers until the blank of material has been formed into the desired part. The apparatus includes a die holder, a die adapted for insertion into said die holder, said die having a central cavity and at the extremities of said die, outer cavities in the desired shapes, a split retaining ring adapted to maintain said die in alignment, two die springs fitting the interior of said die holder, one on each end of said die and two plungers having a sliding fit with the interior walls of said die holder.

DESCRIPTION

The invention is described with specific reference to the forming of tensile specimens albeit the apparatus and method described have general applicability. Therefore, it will be understood that the invention is only limited by the claims and that the claims are intended to cover all changes and modifications of the examples of the invention herein chosen for the purposes of illustration, which do not constitute departures from the spirit and scope of the invention.

While it is a primary object of the invention to provide a means and a method of making tensile specimens it will be clear to those skilled in the art that many other articles may be made using this invention. Examples of such articles include push rod pins, knuckle pins, yoke pins, etc. It is contemplated that metal or plastic parts such as motor valves, fasteners, transistor bases, gear inserts, link pins, plugs, rivets may be made. Fasteners such as screws, bolts and the like may be formed in two steps; the head of the fastener is first formed on both ends of a rod blank by the process of this invention, then the headed rod blank is cut in the middle and the threads are formed on the fastener.

Because the central die cavity loosely fits the blank material it is also possible to cut the blank used to make bolts, screws, etc. into two parts before insertion into the die cavity. The heads are then upset on the blanks. The ends of the blanks abutting in the central cavity are held in alignment during upsetting by the loose fitting die cavity in such a manner that deformation occurs only at outer ends of the die cavity.

This invention is particularly advantageous in the manufacture of high strength bolts and fasteners. In the fabrication of these items it is necessary to avoid extreme cold working of the bolt body that would be detrimental to the physical properties of the fastener. Extremely high strength fasteners are now produced from solid stock by machining method that result in high scrap loss and inordinate labor costs.

It is particularly advantageous for several reasons to use this invention in the preparation of tensile specimens. For example, shoulder type micro-tensile specimens can be made from as little as about 0.012 cubic inch of metal when desired because of the costly and scarce nature of many materials. The rod blanks from which the tensile specimens are made are not gripped in the critical areas therefore the head forming does not score or mar the body of the tensile specimen. The gauge length of the specimen is accurately maintained because the specimen is restrained from buckling by the loose fitting die. By the term "loose fitting," as used herein, is meant that the forces of the die against the blank are small compared to the force on the upsetting plungers or those forces necessary to provide blank to die friction capable of sustaining the upsetting force. The die design, therefore limits the cold work to the head portions where it will not effect the measurement of the tensile properties of the specimen.

Figure 2:
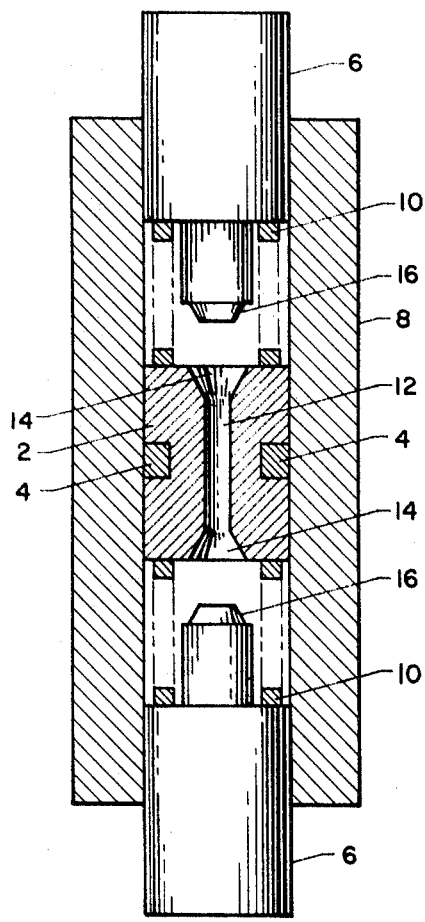
Figure 3:
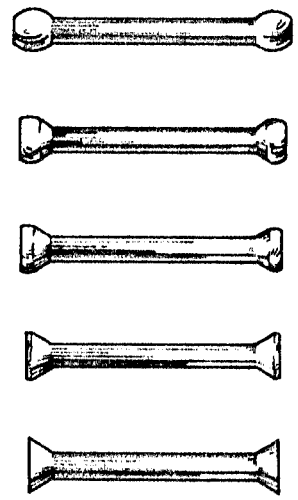
Figure 4:
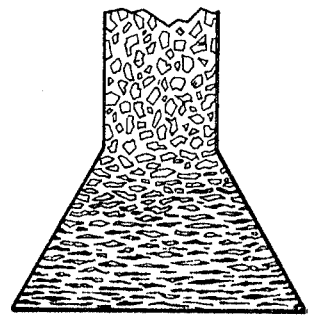
Figure 5:
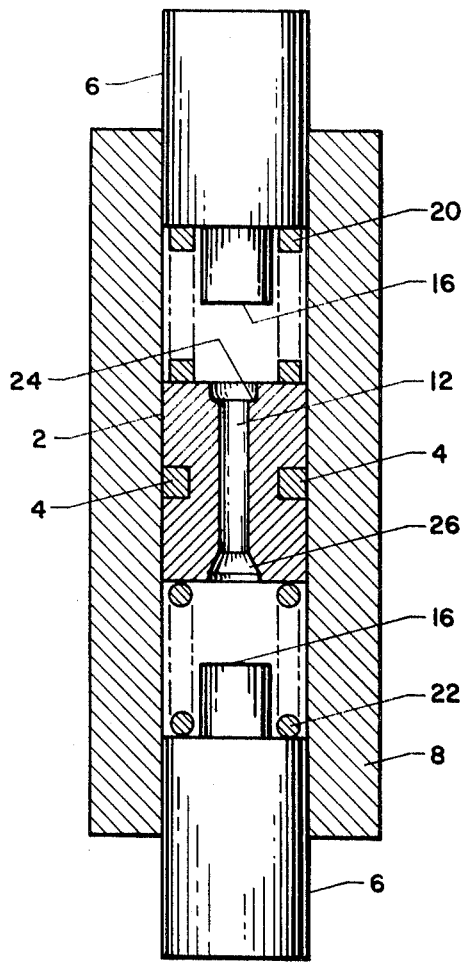

The invention will be better understood by reference to the drawings in which a preferred embodiment of this invention is illustrated. FIG. 1, shows in perspective an exploded view of the preferred embodiment of this invention. FIG. 2 is a section through the assembled device of FIG. 1 showing the parts thereof in an operative relationship. FIG. 3 illustrates tensile specimens in various stages of deformation. FIG. 4 is a pictorial representation of macrograph of an etched longitudinal section of an as formed copper tensile specimen showing that the cold work structure is limited to the head of the specimen. FIG. 5 is a section through an assembled apparatus for simultaneously upset forming both ends of a ductile material illustrating another preferred embodiment thereof.

With reference to FIG. 2 there is illustrated in cross section a die assembly comprising a split die 2, locked in position with a split retaining ring 4. The cavity of the split die 2, for the purpose of illustrating the preferred embodiment of this invention, is in the shape of shoulder type tensile specimen. The split die 2 fits inside tubular die holder 8 with sufficient clearances for a sliding fit. The central portion or cavity 12 of the die cavity for producing tensile specimens is cylindrical. At each extremity of the central portion or cavity 12 of the die cavity are the outer cavities or head forming portions. In the case of tensile specimens, as illustrated here, the volume and shape of each of the head forming portions 14 is the same. Die springs 10 are located abutting each end of the split die 2. Head forming means or plungers 6 having a sliding fit with the interior of the die holder have one end thereof equipped with a projection 16 or a cavity adapted to coact with the die cavity to form the desired configurations. The die springs 10 allow both plungers 6 to advance the same amount thus automatically and simply centering the rod blank in the die cavity. The plungers 6 may, if desired, have small flats ground down the side to eliminate the air cushion.

In the embodiment shown in FIGS. 1 and 2 the head forming portions 14 are equal in volume. Therefore the die springs 10 are selected so that they (1) have the same spring rate and free length or (2) have different spring rates with selected free lengths such that when both forming means or plungers 6 come into contact with the ductile blank that the blank is centrally positioned in the die cavity. The term "spring rate" as used herein refers to the force per unit of deflection for the full length of the spring. The term "free length" refers to the total length of the spring in an uncompressed or load free state.

In an alternative embodiment of this invention, as illustrated in FIG. 5, the configuration of the cavity in the split die 2 is changed. The central portion 12 of the die cavity is such that the blank to be formed has a lose fit therewith. At the extremities of the central portions 12 the head forming portions 14 may be of equal or unequal volumes and the same or different shapes. When the head forming portions are of unequal volumes the die springs are selected as a function of the spring rates and free lengths such that when plungers or forming means 6 are advanced toward the blank the blank is preferentially off-centered to position more stock at the head forming portion of the die requiring a larger volume of material. The off-centered positioning results from unlike springs supporting plungers at different distances from the split die during initial contact with the ductile blank. This off-centered positioning may be accomplished in any one of three ways. First the springs may be selected to have the same spring rates and different free lengths; secondly, the springs may be selected to have the same free length and different spring rates. Finally, the springs may be selected to have both different spring rates and different free lengths so that in any case when the plungers come into contact with both ends of the ductile blank the blank is automatically and preferentially off-centered in proportion to the volume of the head forming portions of the die before any forming action takes place. In FIG. 5 there is illustrated an assembled apparatus having a split die having head forming portions 24 and 26 of unequal volumes and different shapes. The die springs 20 and 22 illustrated in FIG. 5 demonstrate the use of die springs which are selected as a function of the spring rates and free lengths such that when plungers 16 are advanced toward the blank in the split die that the blank is preferentially off-centered to position more stock at the head forming portion of the die 26 requiring a larger volume of material.

The following specific example is illustrative but not limitative of our invention, it being understood that similar improved results are obtainable with other configurations. All such variations which do not depart from the basic concept of our invention are intended to come within the scope of the appended claims.

EXAMPLE

Shoulder type tensile specimens were made in accordance with the process of this invention from several different metals.

The test materials (shown in Table I, below) for the shoulder type tensile specimens were swaged to a rod diameter which had a "loose fit" (i.e. a push fit) with the inside surface of the die cavity and were cut to 1.53 inches in length. The diameter of the central portion of die cavity shown in the die assembly, FIG. 1 was 0.100 inch. The split die halves and retaining ring were assembled with the specimen blank in place. The assembled die cavity was then placed in the cylindrical die holder. Die springs having the same spring rates and free lengths were inserted in each end of the cylinder and the plungers were inserted. The die assembly was then placed in a hydraulic press. The press was actuated urging the plungers toward the test rod specimen in the die cavity. Since the spring rates and free lengths were the same the die springs caused both plungers to advance identically thus automatically positioning the test rod specimen in the die cavity before upsetting of the ends started. The pressing operation was continued until the desired degree of upsetting was completed. Because the test rod specimens were automatically positioned centrally in the die cavity the test rod specimens were formed with equal size heads. A minimum amount of cold working is induced in the test section of the specimens as severe gripping is not required.

Binding of the plungers in the die holder was eliminated by allowing sufficient bearing length between the plungers and die holder, a minimum length was found to be half the plunger diameter, and by using springs of sufficient rigidity such that spring buckling does not occur. The spring rigidity when using unlike springs should be such that its effect becomes negligible during the upsetting phase of the forming operation. Otherwise an underformed or oversized head will develop in that the spring will carry a significant share of the applied load along with the forming head.

Table I lists the pressing forces used for a variety of metals formed into shoulder type tensile specimens on a 50 ton hydraulic platen press. Tensile specimens have also been prepared from alloys of nickel-boron, iron-phosphorous, and copper-bismuth.

TABLE I

| Material: | Force, lbs.[1] |
|---|---|
| High purity tin | 650 |
| 5154 aluminum | 4,600 |
| High purity copper | 4,600 |
| OFHC copper, soft | 5,700 |
| OFHC copper, hard | 5,700 |
| Admiralty brass | 6,800 |
| Cupro-30% nickel | 6,800 |
| High purity nickel | 7,400 |
| High purity iron | 8,000 |
| T-303 stainless steel, annealed | 15,600 |

[1] The force was measured through the hydraulic cylinder pressure and included the die spring force.

When the process and apparatus of this invention is used to make shoulder type tensile specimens as outlined in the example several advantages over the prior art methods were readily apparent. Substantial savings in time and cost was gained as shown by our experience that a tensile test specimen may be swaged, cut off and formed in about one-fourth the time needed to swage the material to stock size and centerless grind the reduced section with shaped wheels. Costly and scarce nature of some materials being tested required that as little material as possible be used. Using the apparatus and process of this invention a micro-tensile test specimen of a one inch gage length may be made from as little as about 0.012 cubic inch of metal with no metal loss due to the formation of swarf, chips or turnings.

What we claim is:

1. A method of simultaneously positioning and upsetting both ends of a blank of ductile material without gripping the central portion of said blank comprising the steps of placing said blank of ductile material in a cylindrical open ended loose fitting die, said die positioned within a die holding member and having a sliding fit therewith, providing selected spring means at each end of said die, advancing forming means toward the ends of said blank wherein said forming means engages said selected spring means before contacting the ends of said blank thereby automatically positioning said blank in said die prior to said forming means upsetting the ends of said blank, and continuing to advance said forming means until the ends of said blank are upset to conform to a cavity in said die.

2. The method of forming shoulder type tensile specimens from cylindrical shaped blanks of ductile material by simultaneously upsetting both ends of said blanks without auxiliary gripping of said blanks comprising the steps of placing a blank of ductile material in an open ended loose fitting die having a shoulder type tensile specimen cavity, placing said die within a die holding member, said die having a sliding fit with said member, providing spring means having selected spring rates and free lengths at each end of said die, advancing shoulder forming means toward the ends of said blank while said shoulder forming means engages said spring means to automatically position said blank in said die and continuing to advance said forming means until the ends of said blank are upset to form shoulders on said blank.

3. The method of claim 2 wherein said spring means have the same spring rate and the same free length.

4. A die assembly for simultaneously positioning and upsetting both ends of a blank of ductile material without auxiliary gripping comprising a die holding member, a cylindrical split die having a recess around the outer diameter, said die inserted in the member and having a sliding fit therewith, a die retaining means in the recess to hold the split die in alignment during the positioning and upsetting operation, die springs having selected spring rates and free lengths in the die holding member, an inner end of the die springs adjacent and adapted to react with outer ends of the split die, plungers having a sliding fit with the die holding member adjacent outer ends of the die springs, and the plungers when advanced toward the outer ends of the split die adapted to react with the outer ends of the die springs to automatically position a blank of ductile material in the split die.

5. The die assembly of claim 4 wherein thet split die has a cavity having unequal volume head forming shapes at the outer ends thereof and die springs having spring rate and free length combinations in proportion to the volumes of the head forming shapes such that when the plungers advance toward the outer ends of the die the blank of ductile material is proportionally positioned with relation to the volumes of the head forming shapes.

6. The die assembly of claim 4 wherein the split die has a cavity having equal volume and non-uniform head forming shapes at the outer ends thereof and die springs having the same spring rate and same free length.

7. A die assembly for forming shoulder type tensile specimens from a blank of ductile material by simultaneously positioning and upsetting both ends of a blank of ductile material without auxiliary gripping comprising a die holding member, a cylindrical split die having a recess around the outer diameter, said die inserted in the member and having a sliding fit therewith, the split die having a cavity at its outer ends in the shape of a shoulder type tensile specimen, a die retaining means in the recess to keep the die from slipping during the positioning and upsetting operation, die springs in the die holding member, an inner end of the die springs adjacent and adapted to react with outer ends of the split die and plungers having a sliding fit with the die holding member adjacent the outer ends of the die springs, the die springs having selected spring rates such that when the plungers advancing toward the outer ends of the split die react with the die springs whereby a blank of ductile material in the die will be automatically centered in the die cavity.

References Cited

UNITED STATES PATENTS

| | | | |
|---|---|---|---|
| 376,673 | 1/1888 | Mutimer | 10—27 |
| 1,911,180 | 5/1933 | Corlett | 10—27 |
| 2,278,293 | 3/1942 | Watson | 10—27 |
| 3,253,287 | 5/1966 | Friedman | 10—27 |
| 126,495 | 5/1872 | Seward | 72—354 |
| 369,487 | 9/1887 | Wellman | 72—354 |
| 1,643,225 | 9/1927 | Smith | 72—354 |
| 2,015,598 | 9/1935 | Harvey et al. | 10—86 |
| 353,192 | 11/1886 | White | 10—26 |
| 1,691,879 | 11/1928 | Blakeslee | 10—86 |

FOREIGN PATENTS

| | | |
|---|---|---|
| 943,800 | 6/1956 | Germany. |
| 593,142 | 9/1947 | Great Britain. |
| 15,653 | 10/1890 | Great Britain. |

CHARLES W. LANHAM, Primary Examiner

E. M. COMBS, Assistant Examiner

U.S. Cl. X.R.

10—24, 27; 72—354, 361

UNITED STATES PATENT OFFICE
CERTIFICATE OF CORRECTION

Patent No. 3,588,933　　　　　　　　　Dated June 29, 1971

Inventor(s) George J. Shinopulos et al.

It is certified that error appears in the above-identified patent and that said Letters Patent are hereby corrected as shown below:

In the heading to the printed specification, line 8, after "Weston, Mass. 02193" insert -- assignors to Kenneth Copper Corporation, New York, N.Y. --.

Signed and sealed this 2nd day of May 1972.

(SEAL)
Attest:

EDWARD M. FLETCHER, JR.　　　　　　　　ROBERT GOTTSCHALK
Attesting Officer　　　　　　　　　　　　Commissioner of Patents